No. 771,607. PATENTED OCT. 4, 1904.
T. J. BURNS.
CAMERA.
APPLICATION FILED JULY 7, 1904.
NO MODEL.

Witnesses:

Inventor
T. J. Burns
By
Attorneys

No. 771,607. Patented October 4, 1904.

UNITED STATES PATENT OFFICE.

TIMOTHY J. BURNS, OF PITTSBURG, PENNSYLVANIA.

CAMERA.

SPECIFICATION forming part of Letters Patent No. 771,607, dated October 4, 1904.

Application filed July 7, 1904. Serial No. 215,619. (No model.)

*To all whom it may concern:*

Be it known that I, TIMOTHY J. BURNS, a citizen of the United States of America, residing at Pittsburg, in the county of Allegheny and State of Pennsylvania, have invented certain new and useful Improvements in Cameras, of which the following is a specification, reference being had therein to the accompanying drawings.

This invention has relation to cameras, and has for its object to provide a novel attachment which may be readily applied to cameras of the ordinary and well-known form; and the object of my attachment is to provide means whereby a plurality of pictures may be projected upon a sensitized plate, means being provided for artistically and symmetrically arranging the pictures upon the plate without removing the sensitized plate from the camera.

Another object of my invention is to provide novel means whereby pictures of different dimensions may be projected upon a sensitized plate, and in constructing my improved attachment the same is constructed upon as simple lines as possible to maintain a strong and durable construction, at the same time one which will be comparatively inexpensive to manufacture and highly efficient to the many usages to which it is applied.

Briefly described, my invention consists of providing a rectangular framework which is adapted to be secured to the lens-holder of a camera, this rectangular framework being constructed whereby the frames may be adjusted and moved to any position desired, and over said framework I employ a suitable elastic hood, which will conform to the different shapes the framework may be adjusted to.

The above construction will be hereinafter more fully described, and specifically pointed out in the claims.

Figure 1:
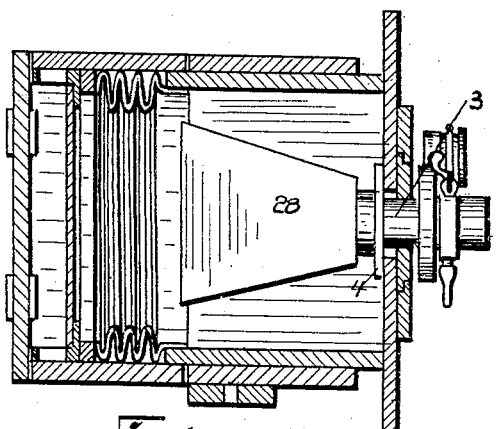
Figure 2:
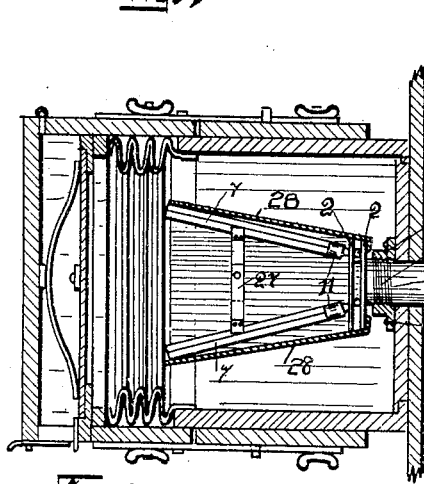
Figure 3:
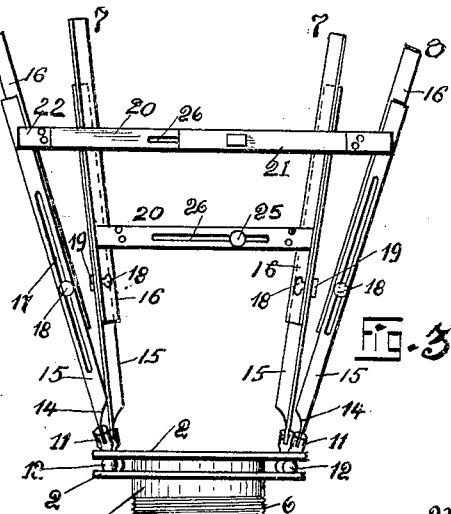
Figure 4:
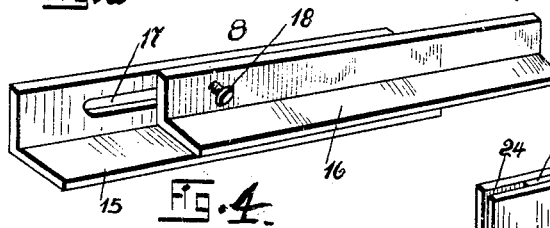
Figure 5:
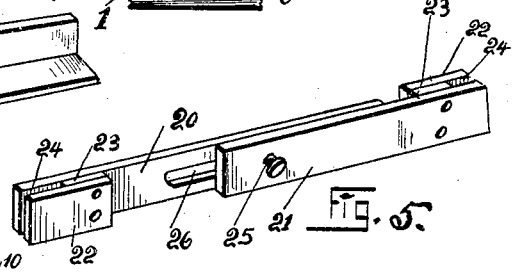
Figure 6:
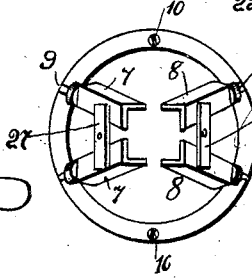

In the accompanying drawings, Figure 1 is a vertical sectional view of my improved camera. Fig. 2 is a horizontal sectional view of the same. Fig. 3 is a detail perspective view of my improved attachment. Fig. 4 is a detail perspective view of one of the frames of the attachment. Fig. 5 is a perspective view of one of the adjusting-braces; and Fig. 6 is a top plan view of the attachment, showing the same in one of its positions.

Throughout the several views of the drawings like numerals of reference indicate like parts, and in the drawings accompanying this application I have illustrated my improved attachment upon a camera wherein an ordinary form of shutter and lens mechanism is used, and also a bellows and ground-glass focusing-plate, the ordinary means being employed for adjusting the focusing-plate and the portion of the camera which is adapted to contain the plate-holders, all these parts being common and of a well-known construction. Therefore, reference will only be had to my improved attachment which I have illustrated by different views in a camera as above described.

To put my invention into practice, I employ a sleeve 1, which carries annular flanges 2 2 upon its one end, and this sleeve is adapted to fit over the rear end of the lens-holder 3, as illustrated in Fig. 1 of the drawings, and in cameras where this lens-holder does not project into the body of the camera I intend to employ an interiorly-screw-threaded collar 4, which is secured to the inner wall of the camera, as indicated at 5, and in this screw-threaded collar is secured the sleeve 1 by forming screw-threads 6 on its one end, this construction being clearly shown in Fig. 2 of the drawings.

The framework of my improved attachment consists of four standards 7 7 and 8 8, these standards being preferably small angle-arms, as illustrated in Fig. 5 of the drawings, and the standards are pivotally mounted between the collars 2 2 by providing the outermost collar with slots 9 9, and prior to securing the two bands together by the screws 10 10 the ends of the standards 7 and 8 are placed in said slots, these ends consisting of a collar 11, which carries a ball 12 upon its lower end, and in the collar 11 is secured the sheared end 14 of the standards 7 and 8, this construction permitting the standards to be swung in any direction desired. The standards are constructed of two pieces 15 and 16, the piece 16 being adjustably mounted upon the piece 15 by providing a slot 17 in the piece 15 of the standard and employing a screw 18 in the piece 16, which is adapted to pass through said slot and carry a nut 19 upon its other end. To space the standards apart at any distance desired or to arrange the standards at different inclinations, I employ adjustable braces, one of which is illustrated in Fig. 6 of the drawings, or I may simply employ a brace, as illustrated in Fig. 7 of the drawings. The braces, as illustrated in Fig. 6 of the drawings and shown applied to the standards in Figs. 2 and 4, consist of two members 20 and 21, the ends of each of these members being provided with plates 22 22. Between said plates and the members 20 and 21 are interposed blocks 23 23, forming slots 24 24, and in these slots is adapted to engage one of the angled sides of the standards 7 and 8. The members 20 and 21 are adjustable one upon the other by a screw 25, which passes through a slot 26, formed in the member 20, this screw being similar to the screw 18, heretofore described. To apply these adjustable forms of braces to the standards, the angled sides of the standards are placed in the slots 24 24, and the inclination of each standard in relation to the other may be adjusted by adjusting the members 20 and 21. In Fig. 4 of the drawings I have illustrated the adjustable braces as secured between the standards 7 7 and 8 8, although the same may be readily used between standards 7 and 8 and 7 and 8 It will thus be seen that the loose ends of the standards can be adjusted as far apart as will be permissible by the adjustment of the members 20 and 21; but it will be impossible to move the loose ends of the standards 7 and 8 farther inwardly than the length of the braces, and to overcome this I employ the form of braces illustrated in Fig. 7 of the drawings, wherein they are shown as being made of a shorter length than the braces heretofore described and are not adjustable. The braces 27 27 are particularly employed where it is desired to arrange the loose ends of the standards 7 and 8 in close proximity to one another.

The reference-numeral 28 designates an elastic cover which is applied to the framework, this cover being made of a material such as rubber, and it is adapted to surround the framework and have its one end secured behind the annular flange 2 of the sleeve 1, while the other end of the cover may be secured to the ends of the standards 7 and 8 by any desired means. This cover is adapted to exclude all light from the framework and protect the subjects or objects being photographed upon the sensitized plate or ground-glass focusing-plate.

By the adjustable features of the framework and the elastic cover I am enabled to produce a picture upon the negative plate of any desired contour or dimensions, and the many advantages derived from my improved attachment will be apparent to those skilled in the art of photography.

What I claim, and desire to secure by Letters Patent, is—

1. An attachment for cameras and the like comprising a framework of adjustable standards adapted to be secured to the lens-holder, means for securing said standards to said lens-holder, and means for bracing said standards, an elastic hood adapted to surround said standards.

2. An attachment for cameras and the like consisting of a sleeve, a plurality of standards pivotally secured to said sleeve, means for adjusting said standards, means for bracing said standards, and an elastic hood adapted to surround said standards.

3. In a device of the character described, the combination with a camera having an adjustable lens-holder mounted therein, of a plurality of standards pivotally connected to said lens-holder, means for adjusting said standards, braces interposed between said standards, means for adjusting said braces, and a hood adapted to surround said standards.

4. In combination with a camera having a lens-holder adjustably mounted therein, a sleeve adapted to be secured to said lens-holder, a plurality of standards pivotally mounted upon said sleeve, means for lengthening said standards, braces interposed between said standards, means for lengthening said braces, an elastic hood secured to said sleeve and adapted to surround said standards.

5. The combination with a camera having an adjustable lens-holder, of a sleeve adapted to be secured to said lens-holder, annular flanges carried by said sleeve, adjustable standards pivotally mounted to said flanges, adjustable braces interposed between said standards, an elastic hood connected to said flanges and adapted to surround said standards, substantially as described.

In testimony whereof I affix my signature in the presence of two witnesses.

TIMOTHY J. BURNS.

Witnesses:
  P. J. BURNS,
  K. H. BUTLER.